US010401659B2

(12) United States Patent
Liu et al.

(10) Patent No.: US 10,401,659 B2
(45) Date of Patent: Sep. 3, 2019

(54) METHOD AND DEVICE FOR INSPECTING DEFECT OF LIQUID CRYSTAL PANEL

(71) Applicants: BOE TECHNOLOGY GROUP CO., LTD., Beijing (CN); BEIJING BOE DISPLAY TECHNOLOGY CO., LTD., Beijing (CN)

(72) Inventors: Jie Liu, Beijing (CN); Zheng Bian, Beijing (CN); Jianbing Su, Beijing (CN); Kaijie Liang, Beijing (CN); Shuyuan Liu, Beijing (CN); Tongbo Sun, Beijing (CN); Siyang Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 277 days.

(21) Appl. No.: 15/650,390

(22) Filed: Jul. 14, 2017

(65) Prior Publication Data

US 2018/0031876 A1      Feb. 1, 2018

(30) Foreign Application Priority Data

Jul. 28, 2016   (CN) .......................... 2016 1 0608741

(51) Int. Cl.
| | |
|---|---|
| *G02F 1/13* | (2006.01) |
| *G02F 1/1333* | (2006.01) |
| *G09F 9/35* | (2006.01) |
| *G09G 3/00* | (2006.01) |
| *H04N 17/04* | (2006.01) |

(52) U.S. Cl.
CPC .......... *G02F 1/1309* (2013.01); *G02F 1/1333* (2013.01); *G09F 9/35* (2013.01); *G09G 3/006* (2013.01); *H04N 17/04* (2013.01)

(58) Field of Classification Search
None
See application file for complete search history.

(56) References Cited

U.S. PATENT DOCUMENTS

| | | | |
|---|---|---|---|
| 2007/0091041 A1* | 4/2007 | Chung | ................... G09G 3/006 345/88 |
| 2014/0098336 A1* | 4/2014 | Mo | ................... G02F 1/133788 349/192 |

* cited by examiner

*Primary Examiner* — Fred H Hu
(74) *Attorney, Agent, or Firm* — Brooks Kushman P.C.

(57) ABSTRACT

The present disclosure provides a method and a device for inspecting a defect of a liquid crystal panel. The method includes steps of: performing AOI treatment on an image of the liquid crystal panel; determining a plurality of to-be-treated targets that do not meet a defect specification requirement in accordance with an AOI treatment result; ranking the plurality of to-be-treated targets in a predetermined order, and acquiring an aggregation degree parameter of every two adjacent to-be-treated targets of the ranked to-be-treated targets; comparing each aggregation degree parameter with a predetermined aggregation degree parameter to acquire a plurality of comparison results; and determining, in accordance with the plurality of comparison results, the to-be-treated targets corresponding to n consecutive aggregation degree parameters smaller than the predetermined aggregation degree parameter as aggregate-type defects of the liquid crystal panel, n being a natural number and greater than or equal to a predetermined value.

14 Claims, 3 Drawing Sheets

METHOD AND DEVICE FOR INSPECTING DEFECT OF LIQUID CRYSTAL PANEL

CROSS-REFERENCE TO RELATED APPLICATIONS

The present application claims a priority of the Chinese Patent Application No. 201610608741.7 filed on Jul. 28, 2016, which is incorporated herein by reference in its entirety.

TECHNICAL FIELD

The present disclosure relates to the field of display technology, in particular to a method and a device for inspecting a defect of a liquid crystal panel.

BACKGROUND

An Automatic Optic Inspection (AOI) technology is a technology for inspecting normal defects based on principles of optics during the manufacture.

During the manufacture, a liquid crystal panel may be inspected using an AOI device. At first, treatment is performed on an original image, and image division is performed on the treated image so as to extract targets. Next, comparison is performed on the targets in accordance with defect specifications (including size, length, contrast and Semu). The targets that meet the defect specification requirements may be inspected by the AOI device and deemed as defects.

However, due to their specialty, it is impossible to inspect such aggregate-type defects which have very low contrast and very bad visual discrimination, e.g., intensive stripes or Mura, using the above-mentioned defect specifications. In the case that the limitations of the defect specifications are tightened, erroneous inspection, e.g., false defects such as a trajectory of a chuck or mild grayscale unevenness, may occur due to the other factors. At this time, the workload for confirming the defects artificially may increase. In the case that the limitations of the defect specifications are relaxed, some defects may be missed during the inspection. Hence, how to inspect the aggregate-type defects effectively remains a research focus.

SUMMARY

An object of at least one embodiment of the present disclosure is to provide a method and a device for inspecting a defect of a liquid crystal panel, so as to effectively inspect the aggregate-type detects of the liquid crystal panel without changing the defect specifications.

In one aspect, the present disclosure provides in some embodiments a method for inspecting a defect of a liquid crystal panel, including steps of: performing AOI treatment on an image of the liquid crystal panel; determining a plurality of to-be-treated targets that do not meet a defect specification requirement in accordance with an AOI treatment result; ranking the plurality of to-be-treated targets in a predetermined order, and acquiring an aggregation degree parameter of every two adjacent to-be-treated targets of the ranked to-be-treated targets, the predetermined order being an ascending order of abscissa values of the plurality of to-be-treated targets or an ascending order of ordinate values of the plurality of to-be-treated targets; comparing each aggregation degree parameter with a predetermined aggregation degree parameter to acquire a plurality of comparison results; and determining, in accordance with the plurality of comparison results, the to-be-treated targets corresponding to n consecutive aggregation degree parameters smaller than the predetermined aggregation degree parameter as aggregate-type defects of the liquid crystal panel, n being a natural number and greater than or equal to a predetermined value.

In a possible embodiment of the present disclosure, the aggregation degree parameter includes an abscissa aggregation degree parameter and an ordinate aggregation degree parameter. The step of ranking the plurality of to-be-treated targets in accordance with the predetermined order includes: acquiring coordinate values of the plurality of to-be-treated targets; and ranking, in accordance with the predetermined order, the plurality of to-be-treated targets in accordance with the acquired coordinate values, the predetermined order being an ascending order of abscissa values of the plurality of to-be-treated targets or an ascending order of ordinate values of the plurality of to-be-treated targets. The step of acquiring the aggregation degree parameter of every two adjacent to-be-treated targets of the ranked to-be-treated targets includes, with respect to the ranked to-be-treated targets, taking an absolute value of a difference between the abscissa values of every two adjacent to-be-treated targets as the abscissa aggregation degree parameter of the two adjacent to-be-treated targets and taking an absolute value of a difference between the ordinate values of every two adjacent to-be-treated targets as the ordinate aggregation degree parameter of the two adjacent to-be-treated targets.

In a possible embodiment of the present disclosure, the predetermined aggregation degree parameter includes a predetermined abscissa aggregation degree parameter and a predetermined ordinate aggregation degree parameter. The step of comparing each aggregation degree parameter with the predetermined aggregation degree parameter to acquire the plurality of comparison results includes comparing the abscissa aggregation degree parameter and the ordinate aggregation degree parameter of each aggregation degree parameter with the predetermined abscissa aggregation degree parameter and the predetermined ordinate aggregation degree parameter respectively, to acquire a plurality of abscissa comparison results and a plurality of ordinate comparison results.

In a possible embodiment of the present disclosure, the step of determining, in accordance with the plurality of comparison results, the to-be-treated targets corresponding to the n consecutive aggregation degree parameters smaller than the predetermined aggregation degree parameter as the aggregate-type defects of the liquid crystal panel includes determining, in accordance with the comparison results, the to-be-treated targets corresponding to n consecutive aggregation degree parameters, where the abscissa aggregation degree parameters and the ordinate aggregation degree parameters are smaller than the predetermined abscissa aggregation degree parameter and the predetermined ordinate aggregation degree parameter respectively, as the aggregate-type defects of the liquid crystal panel.

In a possible embodiment of the present disclosure, the step of performing the AOI treatment on the image of the liquid crystal panel includes: performing denoising treatment on the image of the liquid crystal panel; for the image of the liquid crystal panel acquired after the denoising treatment, at a block-like region having a predetermined point as a center and having a predetermined size, comparing a grayscale value of the predetermined point with grayscale values of pixels in a predetermined direction at the block-like region to acquire a plurality of difference values; acquiring from the plurality of difference values, to-betreated difference values greater than or equal to a predetermined difference value; and determining pixels corresponding to the to-be-treated difference values in the predetermined direction to acquire the targets that meet the defect specification requirement.

In another aspect, the present disclosure provides in some embodiments a method for inspecting a defect of a liquid crystal panel, including steps of: acquiring an image of the liquid crystal panel and performing denoising treatment on the image of the liquid crystal panel; for the image of the liquid crystal panel acquired after the denoising treatment, at a block-like region having a predetermined point as a center and having a predetermined size, comparing a grayscale value of the predetermined point with grayscale values of pixels in a predetermined direction at the block-like region to acquire a plurality of difference values; acquiring from the plurality of difference values to-be-treated difference values greater than or equal to a predetermined difference value; determining pixels corresponding to the to-be-treated difference values in the predetermined direction to acquire the targets that meet the defect specification requirement, and taking the remaining pixels as to-be-treated targets; establishing an x-y coordinate system using a horizontal extension direction and a vertical extension direction of the pixels as coordinate axis directions and using pixel as a coordinate unit; ranking the to-be-treated targets in a predetermined order, the predetermined order being an ascending order of abscissa values of the plurality of to-be-treated targets or an ascending order of ordinate values of the plurality of to-be-treated targets; taking an absolute value of a difference between abscissa values of every two adjacent to-be-treated targets as an abscissa aggregation degree parameter of the two adjacent to-be-treated targets and taking an absolute value of a difference between ordinate values of every two adjacent to-be-treated targets as an ordinate aggregation degree parameter of the two adjacent to-be-treated targets; comparing each abscissa aggregation degree parameter and each ordinate aggregation degree parameter with a predetermined abscissa aggregation degree parameter and a predetermined ordinate aggregation degree parameter respectively; and determining, in accordance with the comparison results, the to-be-treated targets corresponding to n consecutive aggregation degree parameters, where the abscissa aggregation degree parameters and the ordinate aggregation degree parameters are smaller than the predetermined abscissa aggregation degree parameter and the predetermined ordinate aggregation degree parameter respectively, as aggregate-type defects of the liquid crystal panel, n being a natural number greater than or equal to a predetermined value.

In yet another aspect, the present disclosure provides in some embodiments a device for inspecting a defect of a liquid crystal panel, including: an AOI module configured to perform AOI treatment on an image of the liquid crystal panel; a to-be-treated target determination module configured to determine a plurality of to-be-treated targets that do not meet a defect specification requirement in accordance with an AOI treatment result; an aggregation degree parameter acquisition module configured to rank the plurality of to-be-treated targets in a predetermined order, and acquire an aggregation degree parameter of every two adjacent to-be-treated targets of the ranked to-be-treated targets, the predetermined order being an ascending order of abscissa values of the plurality of to-be-treated targets or an ascending order of ordinate values of the plurality of to-be-treated targets; a comparison module configured to compare each aggregation degree parameter with a predetermined aggregation degree parameter to acquire a plurality of comparison results; and a processing module configured to determine, in accordance with the plurality of comparison results, the to-be-treated targets corresponding to n consecutive aggregation degree parameters smaller than the predetermined aggregation degree parameter as aggregate-type defects of the liquid crystal panel, n being a natural number and greater than or equal to a predetermined value.

In a possible embodiment of the present disclosure, the aggregation degree parameter includes an abscissa aggregation degree parameter and an ordinate aggregation degree parameter. The aggregation degree parameter acquisition module includes: a coordinate acquisition sub-module configured to acquire coordinate values of the plurality of to-be-treated targets; a ranking sub-module configured to rank, in accordance with the predetermined order, the plurality of to-be-treated targets in accordance with the acquired coordinate values, the predetermined order being an ascending order of abscissa values of the plurality of to-be-treated targets or an ascending order of ordinate values of the plurality of to-be-treated targets; and a parameter acquisition sub-module configured to acquire the abscissa aggregation degree parameters and the ordinate aggregation degree parameters of the ranked to-be-treated targets, each abscissa aggregation degree parameter being an absolute value of a difference between the abscissa values of every two adjacent to-be-treated targets, and each ordinate aggregation degree parameter being an absolute value of a difference between the ordinate values of every two adjacent to-be-treated targets.

In a possible embodiment of the present disclosure, the predetermined aggregation degree parameter includes a predetermined abscissa aggregation degree parameter and a predetermined ordinate aggregation degree parameter. The comparison module is further configured to compare the abscissa aggregation degree parameter and the ordinate aggregation degree parameter of each aggregation degree parameter with the predetermined abscissa aggregation degree parameter and the predetermined ordinate aggregation degree parameter respectively, to acquire a plurality of abscissa comparison results and a plurality of ordinate comparison results.

In a possible embodiment of the present disclosure, the processing module is further configured to determine, in accordance with the comparison results, the to-be-treated targets corresponding to n consecutive aggregation degree parameters, where the abscissa aggregation degree parameters and the ordinate aggregation degree parameters are smaller than the predetermined abscissa aggregation degree parameter and the predetermined ordinate aggregation degree parameter respectively, as aggregate-type defects of the liquid crystal panel.

In a possible embodiment of the present disclosure, the AOI module includes: a denoising sub-module configured to perform denoising treatment on the image of the liquid crystal panel; a comparison sub-module configured to, for the image of the liquid crystal panel acquired after the denoising treatment, at a block-like region having a predetermined point as a center and having a predetermined size, compare a grayscale value of the predetermined point with grayscale values of pixels in a predetermined direction at the block-like region to acquire a plurality of difference values; a threshold division sub-module configured to acquire from the plurality of difference values to-be-treated difference values greater than or equal to a predetermined difference value; and a determination sub-module configured to determine pixels corresponding to the to-be-treated difference values in the predetermined direction to acquire the targets that meet the defect specification requirement.

According to the embodiments of the present disclosure, the plurality of to-be-treated targets that do not meet the defect specification requirement may be determined in accordance with the AOI treatment result, and the aggregation degree parameter of every two adjacent to-be-treated targets of the ranked to-be-treated targets may be acquired. Then, the aggregate-type defect of the liquid crystal panel may be determined by analyzing the aggregation degree parameter. As mentioned above, in the embodiments of the present disclosure, the analysis is performed on the basis of the AOI treatment result, so it is unnecessary to change the defect specifications for the AOI treatment. In addition, it is able to effectively inspect the aggregate-type defects of the liquid crystal panel without any change in the defect specifications.

DETAILED DESCRIPTION

The present disclosure will be described hereinafter in conjunction with the drawings and embodiments. The following embodiments are for illustrative purposes only, but shall not be used to limit the scope of the present disclosure.

Figure 1:
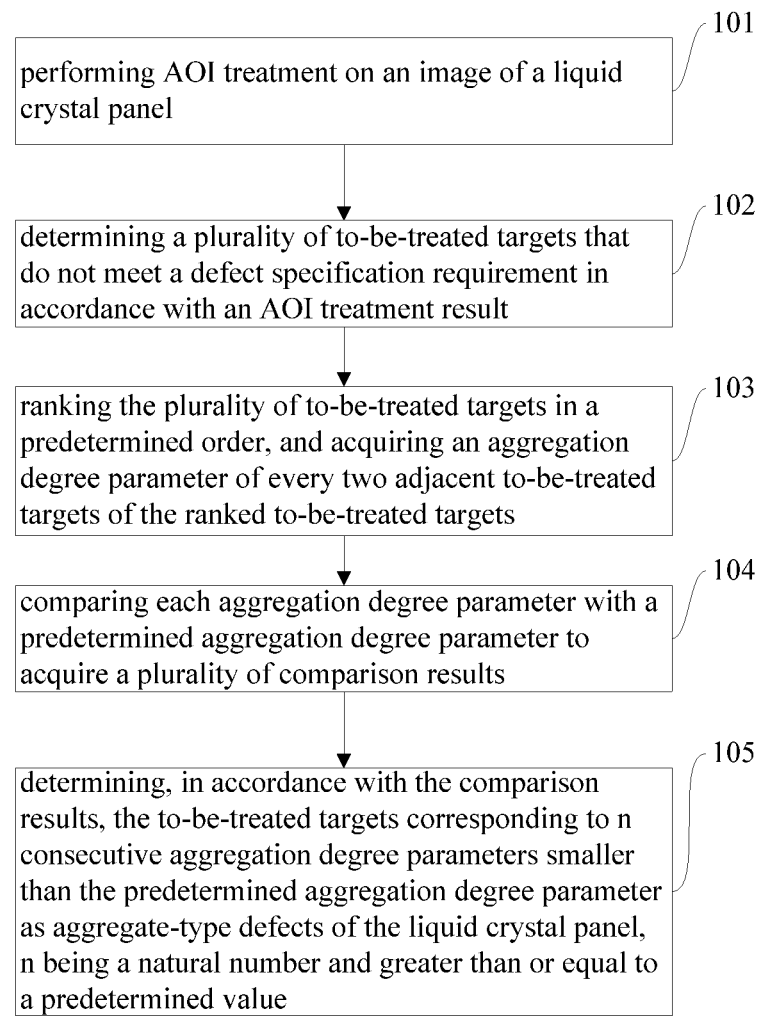
FIG. 1 is a flow chart of a method for inspecting a defect of a liquid crystal panel according to one embodiment of the present disclosure.

As shown in FIG. 1, the present disclosure provides in some embodiments a method for inspecting a defect of a liquid crystal panel, which includes the following steps.

Step 101: performing AOI treatment on an image of the liquid crystal panel.

In this step, the AOI treatment may refer to that in the related art. For example, the image of the liquid crystal panel may be acquired at first, and then denoising treatment may be performed on the image of the liquid crystal panel. For the image of the liquid crystal panel acquired after the denoising treatment, at a block-like region having a predetermined point as a center and having a predetermined size, a grayscale value of the predetermined point may be compared with grayscale values of pixels in a predetermined direction at the block-like region to acquire a plurality of difference values. Then, to-be-treated difference values greater than or equal to a predetermined difference value may be acquired from the plurality of difference values, and contrast for pixels corresponding to the to-be-treated difference values in the predetermined direction may be determined to acquire the targets that meet the defect specification requirement. Here, grayscale value is illustratively taken as the defect specification, and of course, any other parameters may also be used. The predetermined point may be selected according to the practical need, e.g., it may be a center of a to-be-inspected region.

To be specific, Laplace transformation may be performed on an image of the to-be-inspected region. A Laplace operator radius may be an integral multiple of a ratio of a Charge Coupled Device (CCD) resolution to a panel resolution, and it may be an integral (e.g., in the case that the ratio of the CCD resolution to the panel resolution is 3.5, it may be set as 7). Then, threshold division may be performed on the transformed image, and with respect to the target having a value greater than or equal to a predetermined threshold (e.g., 5), its size (the number of pixels), width (the number of the pixels in a long-side direction) and mean grayscale value may be calculated and compared with predetermined size, width and mean grayscale value. In the case that its values are all greater than the predetermined values (which may be set in accordance with the practical need, e.g., the predetermined size may be 10 pixels, the predetermined width may be 6 pixels, and the determined mean grayscale value may be 8), it may be determined as a defect. Here, the block-like region with the predetermined size may be a square with a side length of 3 pixels. The predetermined direction may be four directions from the predetermined point, i.e., upward, downward, leftward and rightward directions, or eight directions, i.e., upper-left, upper-right, lower-left and lower-right directions in addition to the above four directions.

Step 102: determining a plurality of to-be-treated targets that do not meet a defect specification requirement in accordance with an AOI treatment result.

A plurality of targets that meet the defect specification requirement may be acquired through the AOI treatment on the image of the liquid crystal panel, and then inspected as the defects of the liquid crystal panel known in the related art. For the to-be-treated targets that do not meet the defect specification parameter, they may include normal pixels or aggregate-type defects, so they still need to be inspected. In the embodiments of the present disclosure, the plurality of to-be-treated targets that do not meet the defect specification requirement may be acquired in accordance with the AOI treatment result. Here, the aggregate-type defects usually refer to aggregated defects having low contrast.

Step 103: ranking the plurality of to-be-treated targets in a predetermined order, and acquiring an aggregation degree parameter of every two adjacent to-be-treated targets of the ranked to-be-treated targets, the predetermined order being an ascending order of abscissa values of the plurality of to-be-treated targets or an ascending order of ordinate values of the plurality of to-be-treated targets.

Upon the acquisition of the plurality of to-be-treated targets, an x-y coordinate system may be established, with any point as an origin (a certain one of the to-be-treated targets or not), with a horizontal extension direction and a vertical extension direction of the pixels as coordination axis directions and with pixel as a coordinate unit. Hence, coordinate values of the ranked to-be-treated targets may be acquired in accordance with the coordinate system, and then the to-be-treated targets may be ranked in accordance with the predetermined order.

In order to improve the accuracy, in a possible embodiment of the present disclosure, the aggregation degree parameter includes an abscissa aggregation degree parameter and an ordinate aggregation degree parameter. The abscissa aggregation degree parameter refers to an aggregation degree of the to-be-treated targets in an abscissa axis, and the ordinate aggregation degree parameter refers to an ordinate degree of the to-be-treated targets in an ordinate axis.

To be specific, with respect to the ranked to-be-treated targets, an absolute value of a difference between the abscissa values of every two adjacent to-be-treated targets may be taken as the abscissa aggregation degree parameter of the two adjacent to-be-treated targets, and an absolute value of a difference between the ordinate values of every two adjacent to-be-treated targets may be taken as the ordinate aggregation degree parameter of the two adjacent to-be-treated targets.

Step 104: comparing each aggregation degree parameter with a predetermined aggregation degree parameter to acquire a plurality of comparison results.

As mentioned above, in the embodiments of the present disclosure, the aggregation degree parameter includes the abscissa aggregation degree parameter and the ordinate aggregation degree parameter. Correspondingly, the predetermined aggregation degree parameter may include a predetermined abscissa aggregation degree parameter and a predetermined ordinate abscissa aggregation degree parameter which may be set according to the practical need. For example, each of the predetermined abscissa aggregation degree parameter and the predetermined ordinate aggregation degree parameter may be 5, 10 or 20 coordinate units.

To be specific, in Step 104, the abscissa aggregation degree parameter and the ordinate aggregation degree parameter of each aggregation degree parameter may be compared with the predetermined abscissa aggregation degree parameter and the predetermined ordinate aggregation degree parameter respectively, to acquire a plurality of abscissa comparison results and a plurality of ordinate comparison results.

Step 105: in the case that n consecutive comparison results are all smaller than zero, i.e., the abscissa and ordinate aggregation degree parameters are each smaller than the corresponding predetermined aggregation degree parameter, determining the to-be-treated targets corresponding to n consecutive aggregation degree parameters smaller than the predetermined aggregation degree parameter as aggregate-type defects of the liquid crystal panel, n being a natural number and greater than or equal to a predetermined value.

The predetermined value may be set according to the practical need, e.g., 3, 5, 10, 30, 50 or 100. The aggregation degree parameter is the absolute value of the difference between the abscissa or ordinate values of every two adjacent to-be-treated targets, so each aggregation degree parameter may correspond to two to-be-treated targets.

Among the plurality of abscissa comparison results and the plurality of ordinate comparison results, whether or not each of a first abscissa comparison result and a first ordinate comparison result is smaller than the corresponding predetermined aggregation degree parameter may be determined. In the case of yes, a counter may be incremented by 1 (an initial value of the counter is 0). Next, the other abscissa comparison results and ordinate comparison results may be determined sequentially as mentioned above, until a certain abscissa or ordinate comparison result is greater than or equal to the corresponding predetermined aggregation degree parameter. At this time, a value n of the counter may be acquired. In the case that the value n is greater than or equal to the predetermined value, the to-be-treated targets corresponding to the n consecutive aggregation degree parameters may be taken as the aggregate-type defects of the liquid crystal panel.

As can be seen from the above, in the embodiments of the present disclosure, the analysis is performed on the basis of the AOI treatment result, so it is unnecessary to change the defect specifications for the AOI treatment. In addition, the aggregate-type defects of the liquid crystal panel is determined by analyzing the aggregation degree parameters, so it is able to effectively inspect the aggregate-type defects of the liquid crystal panel without any change in the defect specifications.

The method in the embodiments of the present disclosure will be described hereinafter in more details.

Figure 2:
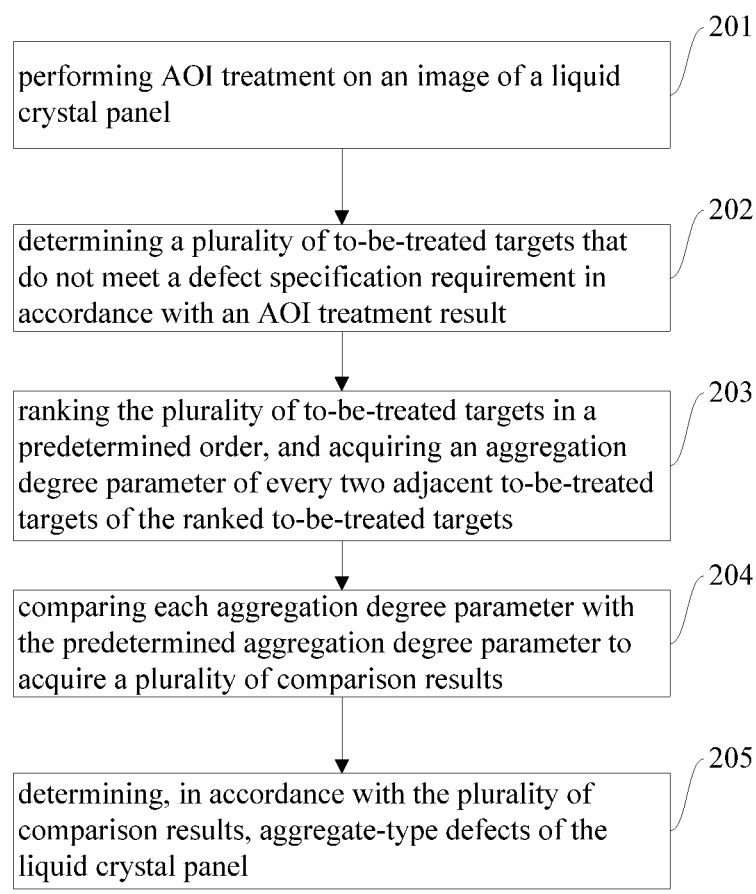
FIG. 2 is another flow chart of the method for inspecting the defect of the liquid crystal panel according to one embodiment of the present disclosure.

As shown in FIG. 2, the method in the embodiments of the present disclosure may include the following steps.

Step 201: performing AOI treatment on the image of the liquid crystal panel.

Step 202: determining the plurality of to-be-treated targets that do not meet the defect specification requirement in accordance with the AOI treatment result.

In Steps 201 and 202, the denoising treatment may be performed on the image of the liquid crystal panel, and the targets in the eight directions may be determined in accordance with the predetermined defect specification. The plurality of to-be-treated targets that do not meet the defect specification requirement may be subjected to the subsequent treatment.

Step 203: ranking the plurality of to-be-treated targets in the predetermined order, and acquiring the aggregation degree parameter of every two adjacent to-be-treated targets of the ranked to-be-treated targets.

The coordinate system may be established by taking any point as an origin, to acquire the coordinate values of each to-be-treated target. Here, the to-be-treated targets may be ranked in an ascending order of the abscissa values. With respect to the ranked to-be-treated targets, an absolute value of a difference between the abscissa values of every two adjacent to-be-treated targets may be taken as the abscissa aggregation degree parameter of the two adjacent to-be-treated targets, and an absolute value of a difference between the ordinate values of every two adjacent to-be-treated targets may be taken as the ordinate aggregation degree parameter of the two adjacent to-be-treated targets.

For example, in Step 203, m to-be-treated targets $n_1$, $n_2$, . . . and $n_m$ have coordinate values of $(x_1, y_1)$, $(x_2, y_2)$, . . . and $(x_m, y_m)$ arranged in an ascending order in an X-axis direction. A sequence of number consisting of X-axis values may be defined as $X=\{x_1, x_2, \ldots x_m\}$, and its difference operator may be calculated by the equation $\Delta x_m=|x_{m+1}-x_m|$. By using this difference operator, a new sequence of number $\Delta X=\{\Delta x_1, \Delta x_2, \ldots \Delta x_{m-1}\}$ may be acquired from the original sequence X, i.e., a sequence of number consisting of the abscissa aggregation degree parameters of every two adjacent to-be-treated targets.

Similarly, a sequence of number consisting of Y-axis values may be defined as $Y=\{y_1, y_2, \ldots y_m\}$, and its difference operator may be calculated by the equation $\Delta y_m=|y_{m+1}-y_m|$. By using this difference operator, a new sequence of number $\Delta Y=\{\Delta y_1, \Delta y_2, \ldots \Delta y_{m-1}\}$ may be acquired from the original sequence Y, i.e., a sequence of number consisting of the ordinate aggregation degree parameters of every two adjacent to-be-treated targets.

Step 204: comparing each aggregation degree parameter with the predetermined aggregation degree parameter to acquire the plurality of comparison results.

With respect to the sequences of number $\Delta X$ and $\Delta Y$ acquired in Step 203, each value may be compared in order with the predetermined abscissa aggregation degree parameter or the predetermined ordinate aggregation degree parameter. A value of the predetermined abscissa aggregation degree parameter may be set identical to or different from a value of the predetermined ordinate aggregation degree parameter. In the embodiments of the present disclosure, the value of the predetermined abscissa aggregation degree parameter may be identical to the value of the predetermined ordinate aggregation degree parameter, and it may be represented by R.

To be specific, in Step 204, each value in the sequence of number $\Delta X$ may be compared in order with R, to acquire a plurality of comparison results (called as a first sequence of results), and each value in the sequence of number $\Delta Y$ may be compared in order with R, to acquire a plurality of comparison results (called as a second sequence of results).

Step 205: determining, in accordance with the plurality of comparison results, the aggregate-type defects of the liquid crystal panel.

To be specific, the to-be-treated targets corresponding to n consecutive aggregation degree parameters smaller than the predetermined aggregation degree parameter may be determined in accordance with the comparison results as the aggregate-type defects of the liquid crystal panel, and n may be a natural number and greater than or equal to the predetermined value. The predetermined value may be set according to be practical need, and it may be represented by C.

With respect to the first sequence of results and the second sequence of results acquired in Step 204, in the case that a first result of each sequence of results is smaller than R, a value of the counter n may be incremented by 1 (an initial value of n is 0). The other results in each sequence of results may be determined in a similar way, until a certain result in each sequence of results is greater than or equal to R. At this time, the value of the counter may be acquired.

Next, the value n may be compared with C. In the case that n is greater than or equal to C, the to-be-treated targets corresponding to the n abscissa aggregation degree parameters or the n ordinate aggregation degree parameters may be taken as the aggregate-type defects of the liquid crystal panel. Each comparison result is acquired by comparing the abscissa aggregation degree parameter or the ordinate aggregation degree parameter with the predetermined abscissa aggregation degree parameter or the predetermined ordinate aggregation degree parameter, and each abscissa or ordinate aggregation degree parameter is acquired in accordance with the abscissa or ordinate values of every two adjacent to-be-treated targets. Hence, in the case that the first to third comparison results in each of the first sequence of results and the second sequence of results meet the above-mentioned condition, the to-be-treated targets corresponding to the first to third comparison results, i.e., corresponding to the first to third aggregation degree parameters, may be taken as the aggregate-type defects of the liquid crystal panel.

Figure 3:
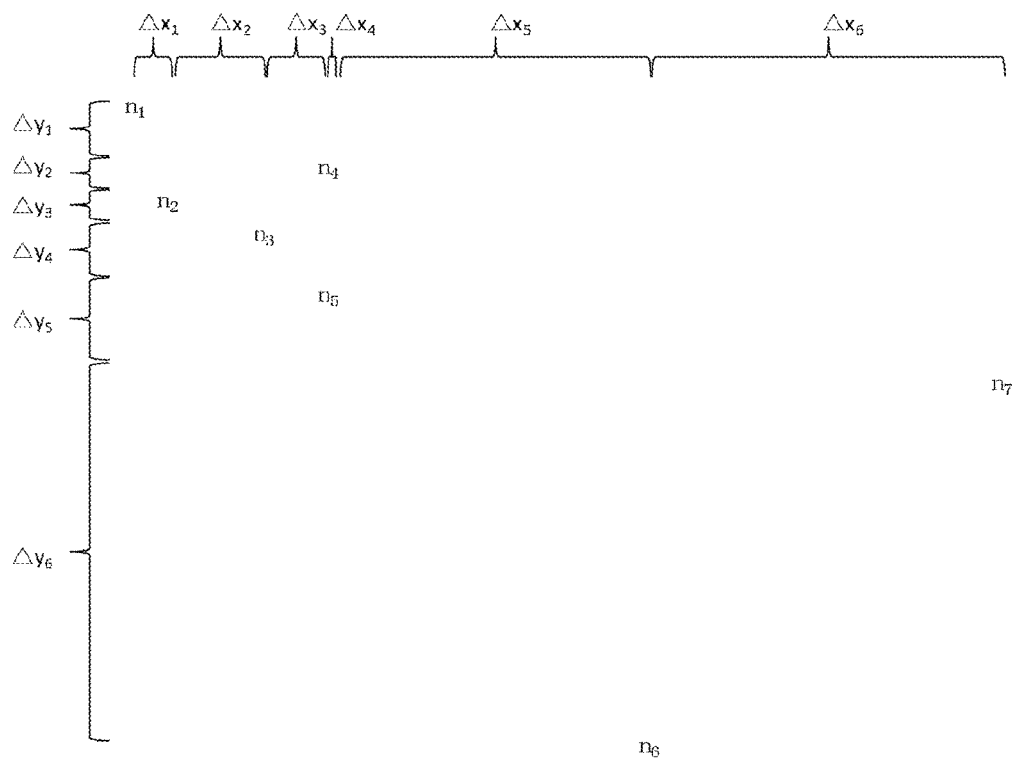
FIG. 3 is a schematic view showing a to-be-treated target according to one embodiment of the present disclosure.

For example, as shown in FIG. 3, with respect to the to-be-treated targets $n_1$ to $n_7$ arranged in an ascending order of the abscissa values, a sequence of the abscissa aggregation degree parameters of every two adjacent to-be-treated targets and a sequence of the ordinate aggregation degree parameters of every two adjacent to-be-treated targets may be represented as $\Delta X=(1, 3, 2, 0, 10, 11)$ and $\neq Y=(2, 1, 1, 2, 3, 13)$. In the case that R=6 and C=3, $\Delta x_1, \Delta y_1, \Delta x_2, \Delta y_2, \Delta x_3, \Delta y_3, \Delta x_4$ and $\Delta y_4$ for the to-be-treated targets $n_1$ to $n_4$ may meet the condition: $\Delta x_n < R$ and $\Delta y_n < R$, and the number of the consecutive aggregate degree parameters is 4, i.e., n=4>C. Hence, the to-be-treated targets $n_1$ to $n_4$ may conform to a characteristic of "aggregation", and thus will be taken as the aggregate-type defects of the liquid crystal panel.

As mentioned above, in the embodiments of the present disclosure, the analysis is performed on the basis of the AOI treatment result, so it is unnecessary to change the defect specifications for the AOI treatment. In addition, the aggregate-type defects of the liquid crystal panel may be determined by analyzing the aggregate degree parameters, so it is able to effectively inspect the aggregate-type defects of the liquid crystal panel without any change in the defect specifications.

Figure 4:
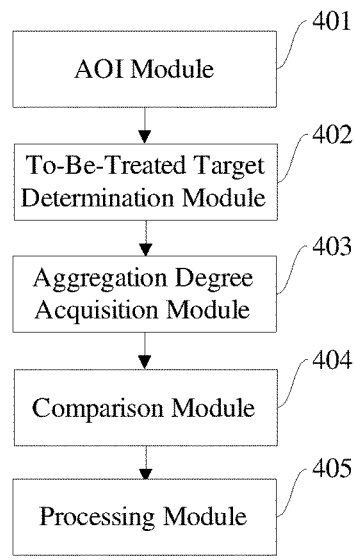
FIG. 4 is a schematic view showing a device for inspecting a defect of a liquid crystal panel according to one embodiment of the present disclosure.

As shown in FIG. 4, the present disclosure further provides in some embodiments a device for inspecting a defect of a liquid crystal panel, which includes: an AOI module 401 configured to perform AOI treatment on an image of the liquid crystal panel; a to-be-treated target determination module 402 configured to determine a plurality of to-be-treated targets that do not meet a defect specification requirement in accordance with an AOI treatment result; an aggregation degree parameter acquisition module 403 configured to rank the plurality of to-be-treated targets in a predetermined order, and acquire an aggregation degree parameter of every two adjacent to-be-treated targets of the ranked to-be-treated targets, the predetermined order being an ascending order of abscissa values of the plurality of to-be-treated targets or an ascending order of ordinate values of the plurality of to-be-treated targets; a comparison module 404 configured to compare each aggregation degree parameter with a predetermined aggregation degree parameter to acquire a plurality of comparison results; and a processing module 405 configured to determine, in accordance with the plurality of comparison results, the to-be-treated targets corresponding to n consecutive aggregation degree parameters smaller than the predetermined aggregation degree parameter as aggregate-type defects of the liquid crystal panel, n being a natural number and greater than or equal to a predetermined value.

Here, the AOI module 401 may be a known AOI device or any other optical detector. The other modules or sub-modules may each be implemented by a processor or an integrated circuit.

In a possible embodiment of the present disclosure, the AOI module 401 includes: a denoising sub-module configured to perform denoising treatment on the image of the liquid crystal panel; a comparison sub-module configured to, for the image of the liquid crystal panel acquired after the denoising treatment, at a block-like region having a predetermined point as a center and having a predetermined size, compare a grayscale value of the predetermined point with grayscale values of pixels in a predetermined direction at the block-like region to acquire a plurality of difference values; a threshold division sub-module configured to acquire from the plurality of difference values, to-be-treated difference values greater than or equal to a predetermined difference value; and a determination sub-module configured to determine pixels corresponding to the to-be-treated difference values in the predetermined direction to acquire the targets that meet the defect specification requirement.

In a possible embodiment of the present disclosure, the aggregation degree parameter includes an abscissa aggregation degree parameter and an ordinate aggregation degree parameter, and the predetermined aggregation degree parameter includes a predetermined abscissa aggregation degree parameter and a predetermined ordinate aggregation degree parameter.

In a possible embodiment of the present disclosure, the aggregation degree parameter acquisition module 403 includes: a coordinate acquisition sub-module configured to acquire coordinate values of the plurality of to-be-treated targets; a ranking sub-module configured to rank, in accordance with the predetermined order, the plurality of to-be-treated targets in accordance with the acquired coordinate values, the predetermined order being an ascending order of abscissa values of the plurality of to-be-treated targets or an ascending order of ordinate values of the plurality of to-be-treated targets; and a parameter acquisition sub-module configured to acquire the abscissa aggregation degree parameters and the ordinate aggregation degree parameters of the ranked to-be-treated targets, each abscissa aggregation degree parameter being an absolute value of a difference between the abscissa values of every two adjacent to-be-treated targets, and each ordinate aggregation degree parameter being an absolute value of a difference between the ordinate values of every two adjacent to-be-treated targets.

In a possible embodiment of the present disclosure, the comparison module 404 is further configured to compare the abscissa aggregation degree parameter and the ordinate aggregation degree parameter of each aggregation degree parameter with the predetermined abscissa aggregation degree parameter and the predetermined ordinate aggregation degree parameter respectively, to acquire a plurality of abscissa comparison results and a plurality of ordinate comparison results.

In a possible embodiment of the present disclosure, the processing module 405 is further configured to determine, in accordance with the comparison results, the to-be-treated targets corresponding to n consecutive aggregation degree parameters, where the abscissa aggregation degree parameters and the ordinate aggregation degree parameters are smaller than the predetermined abscissa aggregation degree parameter and the predetermined ordinate aggregation degree parameter respectively, as aggregate-type defects of the liquid crystal panel.

An operating principle of the device may refer to that mentioned in the above method embodiments.

As mentioned above, in the embodiments of the present disclosure, the analysis is performed on the basis of the AOI treatment result, so it is unnecessary to change the defect specifications for the AOI treatment. In addition, the aggregate-type defects of the liquid crystal panel may be determined by analyzing the aggregate degree parameters, so it is able to effectively inspect the aggregate-type defects of the liquid crystal panel without any change in the defect specifications.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for inspecting a defect of a liquid crystal panel, comprising steps of:
    performing Automatic Optic Inspection (AOI) treatment on an image of the liquid crystal panel;
    determining a plurality of to-be-treated targets that do not meet a defect specification requirement in accordance with an AOI treatment result;
    ranking the plurality of to-be-treated targets in a predetermined order, and acquiring an aggregation degree parameter of every two adjacent to-be-treated targets of the ranked to-be-treated targets, the predetermined order being an ascending order of abscissa values of the plurality of to-be-treated targets or an ascending order of ordinate values of the plurality of to-be-treated targets;
    comparing each aggregation degree parameter with a predetermined aggregation degree parameter to acquire a plurality of comparison results; and
    determining, in accordance with the plurality of comparison results, the to-be-treated targets corresponding to n consecutive aggregation degree parameters smaller than the predetermined aggregation degree parameter as aggregate-type defects of the liquid crystal panel, n being a natural number and greater than or equal to a predetermined value.

2. The method according to claim 1, wherein the aggregation degree parameter comprises an abscissa aggregation degree parameter and an ordinate aggregation degree parameter,
    the step of ranking the plurality of to-be-treated targets in accordance with the predetermined order comprises: acquiring coordinate values of the plurality of to-be-treated targets; and ranking, in accordance with the predetermined order, the plurality of to-be-treated targets in accordance with the acquired coordinate values, the predetermined order being an ascending order of abscissa values of the plurality of to-be-treated targets or an ascending order of ordinate values of the plurality of to-be-treated targets, and
    the step of acquiring the aggregation degree parameter of every two adjacent to-be-treated targets of the ranked to-be-treated targets comprises, with respect to the ranked to-be-treated targets, taking an absolute value of a difference between the abscissa values of every two adjacent to-be-treated targets as the abscissa aggregation degree parameter of the two adjacent to-be-treated targets and taking an absolute value of a difference between the ordinate values of every two adjacent to-be-treated targets as the ordinate aggregation degree parameter of the two adjacent to-be-treated targets.

3. The method according to claim 2, wherein the predetermined aggregation degree parameter comprises a predetermined abscissa aggregation degree parameter and a predetermined ordinate aggregation degree parameter, and
    the step of comparing each aggregation degree parameter with the predetermined aggregation degree parameter to acquire the plurality of comparison results comprises comparing the abscissa aggregation degree parameter and the ordinate aggregation degree parameter of each aggregation degree parameter with the predetermined abscissa aggregation degree parameter and the predetermined ordinate aggregation degree parameter respectively, to acquire a plurality of abscissa comparison results and a plurality of ordinate comparison results.

4. The method according to claim 3, wherein the step of determining, in accordance with the plurality of comparison results, the to-be-treated targets corresponding to the n consecutive aggregation degree parameters smaller than the predetermined aggregation degree parameter as the aggregate-type defects of the liquid crystal panel comprises determining, in accordance with the comparison results, the to-be-treated targets corresponding to n consecutive aggregation degree parameters, where the abscissa aggregation degree parameters and the ordinate aggregation degree parameters are smaller than the predetermined abscissa aggregation degree parameter and the predetermined ordinate aggregation degree parameter respectively, as the aggregate-type defects of the liquid crystal panel.

5. The method according to claim 1, wherein the step of performing the AOI treatment on the image of the liquid crystal panel comprises:
    performing denoising treatment on the image of the liquid crystal panel;

for the image of the liquid crystal panel acquired after the denoising treatment, at a block-like region having a predetermined point as a center and having a predetermined size, comparing a grayscale value of the predetermined point with grayscale values of pixels in a predetermined direction at the block-like region to acquire a plurality of difference values;

acquiring from the plurality of difference values to-be-treated difference values greater than or equal to a predetermined difference value; and determining pixels corresponding to the to-be-treated difference values in the predetermined direction to acquire the targets that meet the defect specification requirement.

6. A method for inspecting a defect of a liquid crystal panel, comprising steps of:

acquiring an image of the liquid crystal panel and performing denoising treatment on the image of the liquid crystal panel;

for the image of the liquid crystal panel acquired after the denoising treatment, at a block-like region having a predetermined point as a center and having a predetermined size, comparing a grayscale value of the predetermined point with grayscale values of pixels in a predetermined direction at the block-like region to acquire a plurality of difference values;

acquiring, from the plurality of difference values, to-be-treated difference values greater than or equal to a predetermined difference value;

determining pixels corresponding to the to-be-treated difference values in the predetermined direction to acquire targets that meet defect specification requirement, and taking the remaining pixels as to-be-treated targets;

establishing an x-y coordinate system using a horizontal extension direction and a vertical extension direction of the pixels as coordinate axis directions and using pixel as a coordinate unit;

ranking the to-be-treated targets in a predetermined order, the predetermined order being an ascending order of abscissa values of the plurality of to-be-treated targets or an ascending order of ordinate values of the plurality of to-be-treated targets;

taking an absolute value of a difference between abscissa values of every two adjacent to-be-treated targets as an abscissa aggregation degree parameter of the two adjacent to-be-treated targets and taking an absolute value of a difference between ordinate values of every two adjacent to-be-treated targets as an ordinate aggregation degree parameter of the two adjacent to-be-treated targets;

comparing each abscissa aggregation degree parameter and each ordinate aggregation degree parameter with a predetermined abscissa aggregation degree parameter and a predetermined ordinate aggregation degree parameter respectively; and determining, in accordance with the comparison results, the to-be-treated targets corresponding to n consecutive aggregation degree parameters, where the abscissa aggregation degree parameters and the ordinate aggregation degree parameters are smaller than the predetermined abscissa aggregation degree parameter and the predetermined ordinate aggregation degree parameter respectively, as aggregate-type defects of the liquid crystal panel, n being a natural number greater than or equal to a predetermined value.

7. A device for inspecting a defect of a liquid crystal panel, comprising:

an Automatic Optic Inspection (AOI) module configured to perform AOI treatment on an image of the liquid crystal panel;

a to-be-treated target determination module configured to determine a plurality of to-be-treated targets that do not meet a defect specification requirement in accordance with an AOI treatment result;

an aggregation degree parameter acquisition module configured to rank the plurality of to-be-treated targets in a predetermined order, and acquire an aggregation degree parameter of every two adjacent to-be-treated targets of the ranked to-be-treated targets, the predetermined order being an ascending order of abscissa values of the plurality of to-be-treated targets or an ascending order of ordinate values of the plurality of to-be-treated targets;

a comparison module configured to compare each aggregation degree parameter with a predetermined aggregation degree parameter to acquire a plurality of comparison results; and a processing module configured to determine, in accordance with the plurality of comparison results, the to-be-treated targets corresponding to n consecutive aggregation degree parameters smaller than the predetermined aggregation degree parameter as aggregate-type defects of the liquid crystal panel, n being a natural number and greater than or equal to a predetermined value.

8. The device according to claim 7, wherein the aggregation degree parameter comprises an abscissa aggregation degree parameter and an ordinate aggregation degree parameter, and the aggregation degree parameter acquisition module comprises: a coordinate acquisition sub-module configured to acquire coordinate values of the plurality of to-be-treated targets; a ranking sub-module configured to rank, in accordance with the predetermined order, the plurality of to-be-treated targets in accordance with the acquired coordinate values, the predetermined order being an ascending order of abscissa values of the plurality of to-be-treated targets or an ascending order of ordinate values of the plurality of to-be-treated targets; and a parameter acquisition sub-module configured to acquire the abscissa aggregation degree parameters and the ordinate aggregation degree parameters of the ranked to-be-treated targets, each abscissa aggregation degree parameter being an absolute value of a difference between the abscissa values of every two adjacent to-be-treated targets, and each ordinate aggregation degree parameter being an absolute value of a difference between the ordinate values of every two adjacent to-be-treated targets.

9. The device according to claim 7, wherein the predetermined aggregation degree parameter comprises a predetermined abscissa aggregation degree parameter and a predetermined ordinate aggregation degree parameter, and the comparison module is further configured to compare the abscissa aggregation degree parameter and the ordinate aggregation degree parameter of each aggregation degree parameter with the predetermined abscissa aggregation degree parameter and the predetermined ordinate aggregation degree parameter respectively, to acquire a plurality of abscissa comparison results and a plurality of ordinate comparison results.

10. The device according to claim 9, wherein the processing module is further configured to determine, in accordance with the comparison results, the to-be-treated targets corresponding to n consecutive aggregation degree parameters, where the abscissa aggregation degree parameters and the ordinate aggregation degree parameters are smaller than the predetermined abscissa aggregation degree parameter and the predetermined ordinate aggregation degree parameter respectively, as aggregate-type defects of the liquid crystal panel.

11. The device according to claim 7, wherein the AOI module comprises:
- a denoising sub-module configured to perform denoising treatment on the image of the liquid crystal panel;
- a comparison sub-module configured to, for the image of the liquid crystal panel acquired after the denoising treatment, at a block-like region having a predetermined point as a center and having a predetermined size, compare a grayscale value of the predetermined point with grayscale values of pixels in a predetermined direction at the block-like region to acquire a plurality of difference values;
- a threshold division sub-module configured to acquire, from the plurality of difference values, to-be-treated difference values greater than or equal to a predetermined difference value; and
- a determination sub-module configured to determine pixels corresponding to the to-be-treated difference values in the predetermined direction to acquire the targets that meet the defect specification requirement.

12. The device according to claim 8, wherein the AOI module comprises:
- a denoising sub-module configured to perform denoising treatment on the image of the liquid crystal panel;
- a comparison sub-module configured to, for the image of the liquid crystal panel acquired after the denoising treatment, at a block-like region having a predetermined point as a center and having a predetermined size, compare a grayscale value of the predetermined point with grayscale values of pixels in a predetermined direction at the block-like region to acquire a plurality of difference values;
- a threshold division sub-module configured to acquire, from the plurality of difference values, to-be-treated difference values greater than or equal to a predetermined difference value; and
- a determination sub-module configured to determine pixels corresponding to the to-be-treated difference values in the predetermined direction to acquire the targets that meet the defect specification requirement.

13. The device according to claim 9, wherein the AOI module comprises:
- a denoising sub-module configured to perform denoising treatment on the image of the liquid crystal panel;
- a comparison sub-module configured to, for the image of the liquid crystal panel acquired after the denoising treatment, at a block-like region having a predetermined point as a center and having a predetermined size, compare a grayscale value of the predetermined point with grayscale values of pixels in a predetermined direction at the block-like region to acquire a plurality of difference values;
- a threshold division sub-module configured to acquire, from the plurality of difference values, to-be-treated difference values greater than or equal to a predetermined difference value; and
- a determination sub-module configured to determine pixels corresponding to the to-be-treated difference values in the predetermined direction to acquire the targets that meet the defect specification requirement.

14. The device according to claim 10, wherein the AOI module comprises:
- a denoising sub-module configured to perform denoising treatment on the image of the liquid crystal panel;
- a comparison sub-module configured to, for the image of the liquid crystal panel acquired after the denoising treatment, at a block-like region having a predetermined point as a center and having a predetermined size, compare a grayscale value of the predetermined point with grayscale values of pixels in a predetermined direction at the block-like region to acquire a plurality of difference values;
- a threshold division sub-module configured to acquire, from the plurality of difference values, to-be-treated difference values greater than or equal to a predetermined difference value; and
- a determination sub-module configured to determine pixels corresponding to the to-be-treated difference values in the predetermined direction to acquire the targets that meet the defect specification requirement.

* * * * *